(12) United States Patent
Lee et al.

(10) Patent No.: US 11,099,450 B2
(45) Date of Patent: Aug. 24, 2021

(54) ELECTROCHROMIC DEVICE

(71) Applicant: LG CHEM, LTD., Seoul (KR)

(72) Inventors: Dong Hyun Lee, Daejeon (KR); Chang Yoon Lim, Daejeon (KR); Su Hee Lee, Daejeon (KR)

(73) Assignee: LG CHEM LTD., Seoul (KR)

( * ) Notice: Subject to any disclaimer, the term of this patent is extended or adjusted under 35 U.S.C. 154(b) by 266 days.

(21) Appl. No.: 16/081,840

(22) PCT Filed: May 8, 2017

(86) PCT No.: PCT/KR2017/004752
§ 371 (c)(1),
(2) Date: Aug. 31, 2018

(87) PCT Pub. No.: WO2017/196035
PCT Pub. Date: Nov. 16, 2017

(65) Prior Publication Data
US 2019/0011794 A1 Jan. 10, 2019

(30) Foreign Application Priority Data
May 9, 2016 (KR) .................. 10-2016-0056310

(51) Int. Cl.
*G02F 1/155* (2006.01)
*G02F 1/153* (2006.01)
(Continued)

(52) U.S. Cl.
CPC .......... *G02F 1/155* (2013.01); *G02F 1/13439* (2013.01); *G02F 1/1533* (2013.01);
(Continued)

(58) Field of Classification Search
None
See application file for complete search history.

(56) References Cited

U.S. PATENT DOCUMENTS 4,773,741 A * 9/1988 Inaba .................. G02F 1/155
359/266
6,327,070 B1 12/2001 Heuer et al.
(Continued)

FOREIGN PATENT DOCUMENTS

JP 64-90422 A 4/1989
JP 1-142927 U 9/1989
(Continued)

OTHER PUBLICATIONS

Extended European Search Report dated Feb. 19, 2019, for European Application No. 17796335.2.
(Continued)

*Primary Examiner* — Christopher Stanford
(74) *Attorney, Agent, or Firm* — Birch, Stewart, Kolasch & Birch, LLP

(57) ABSTRACT

The present invention relates to an electrochromic device, and according to one aspect of the present invention, there is provided an electrochromic device comprising: a first electrode layer, a first electrochromic layer provided on the first electrode layer, an electrolyte layer provided on the first electrochromic layer, a second electrochromic layer provided on the electrolyte layer, and a second electrode layer provided on the second electrochromic layer, wherein it comprises a first auxiliary electrode layer and a second auxiliary electrode layer each provided on each opposite surface of the first electrochromic layer and the second electrochromic layer opposed to each other with the electrolyte layer interposed therebetween, and the first and second auxiliary electrode layers each comprise an electrode portion formed of a metal material and an insulation portion for insulating the electrode portion.

18 Claims, 5 Drawing Sheets

(51) Int. Cl.
*G02F 1/1343* (2006.01)
*G02F 1/15* (2019.01)
(52) U.S. Cl.
CPC ........... *G02F 2001/1502* (2013.01); *G02F 2001/1536* (2013.01); *G02F 2001/1552* (2013.01); *G02F 2001/164* (2019.01)

(56) References Cited

U.S. PATENT DOCUMENTS

| | | | | |
|---|---|---|---|---|
| 6,373,618 | B1* | 4/2002 | Agrawal | G02F 1/1503 |
| | | | | 359/265 |
| 6,562,179 | B1* | 5/2003 | Ikeguchi | C08G 59/4014 |
| | | | | 156/307.5 |
| 9,007,673 | B2* | 4/2015 | Tsai | G02F 1/155 |
| | | | | 359/266 |
| 9,869,918 | B2* | 1/2018 | Matsumoto | G02F 1/13439 |
| 10,139,692 | B2* | 11/2018 | Kim | G02F 1/161 |
| 2007/0076286 | A1 | 4/2007 | Sung et al. | |
| 2010/0243427 | A1 | 9/2010 | Kozlowski et al. | |
| 2012/0154890 | A1 | 6/2012 | Jeon et al. | |
| 2014/0177026 | A1 | 6/2014 | Tsai et al. | |
| 2014/0327950 | A1* | 11/2014 | Trajkovska-Broach | G02F 1/1524 |
| | | | | 359/265 |
| 2016/0011441 | A1* | 1/2016 | Schwartz | G02F 1/1323 |
| | | | | 359/275 |
| 2019/0137841 | A1* | 5/2019 | Koo | G09G 3/19 |

FOREIGN PATENT DOCUMENTS

| | | |
|---|---|---|
| JP | 1-259325 A | 10/1989 |
| JP | 8-335472 A | 12/1996 |
| JP | 2009-84350 A | 4/2009 |
| JP | 2013-58724 A | 3/2013 |
| JP | 2015-527614 A | 9/2015 |
| JP | 2016-507082 A | 3/2016 |
| JP | 2016-512348 A | 4/2016 |
| JP | 2019-508750 A | 3/2019 |
| KR | 10-2012-0067731 A | 6/2012 |
| KR | 10-2013-0015695 A | 2/2013 |
| KR | 10-2013-0112693 A | 10/2013 |
| KR | 10-2015-0087012 A | 7/2015 |
| WO | WO 2017/155373 A1 | 9/2017 |
| WO | WO 2017/196036 A1 | 11/2017 |

OTHER PUBLICATIONS

European Search Report dated Dec. 11, 2019 for Appl. No. 17796335.2.

International Search Report issued in PCT/KR2017/004752 (PCT/ISA/210), dated Aug. 16, 2017.

* cited by examiner

[Figure 1]
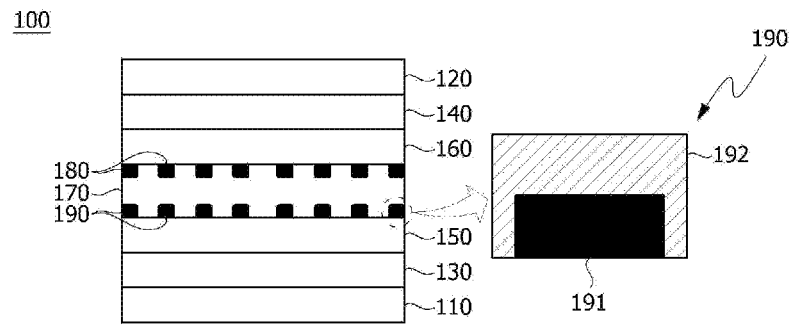
[Figure 2]
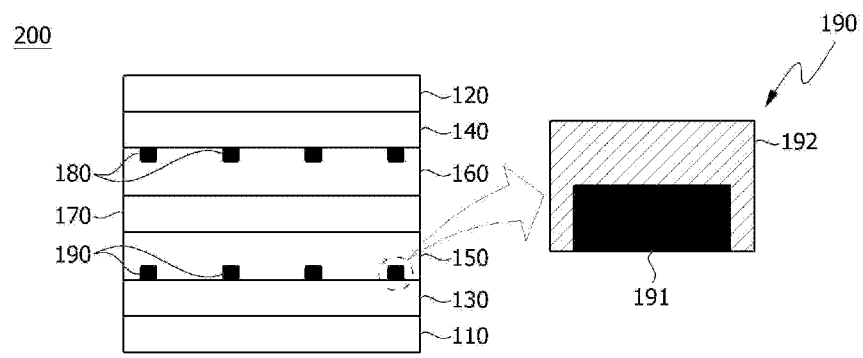
[Figure 3]
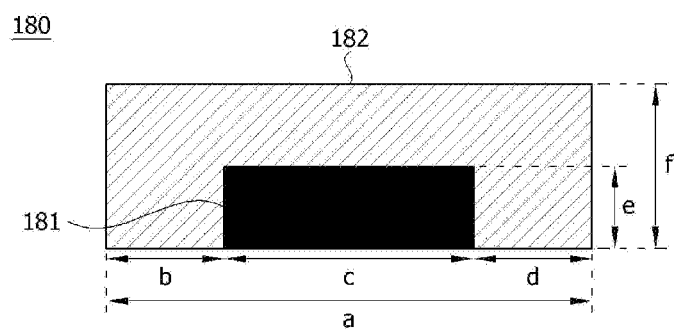

[Figure 4]
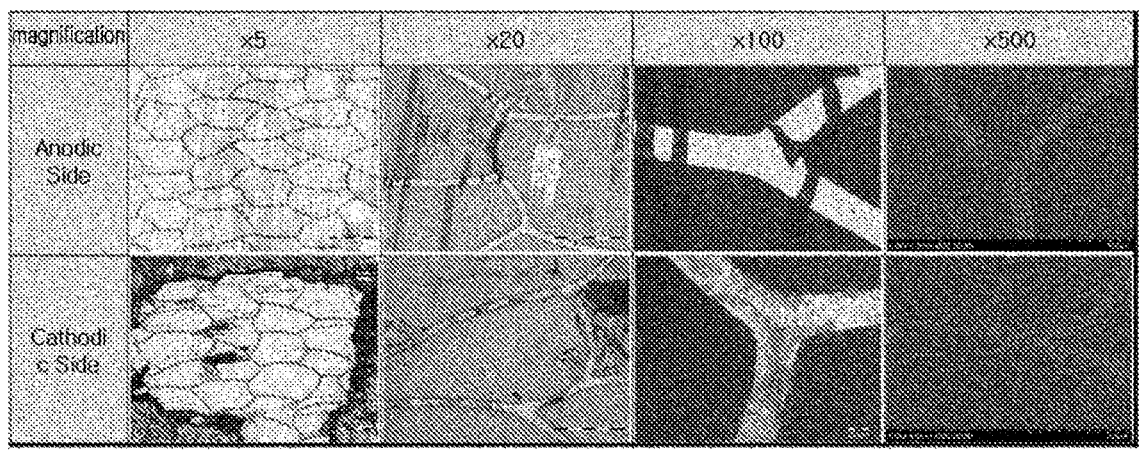
[Figure 5]
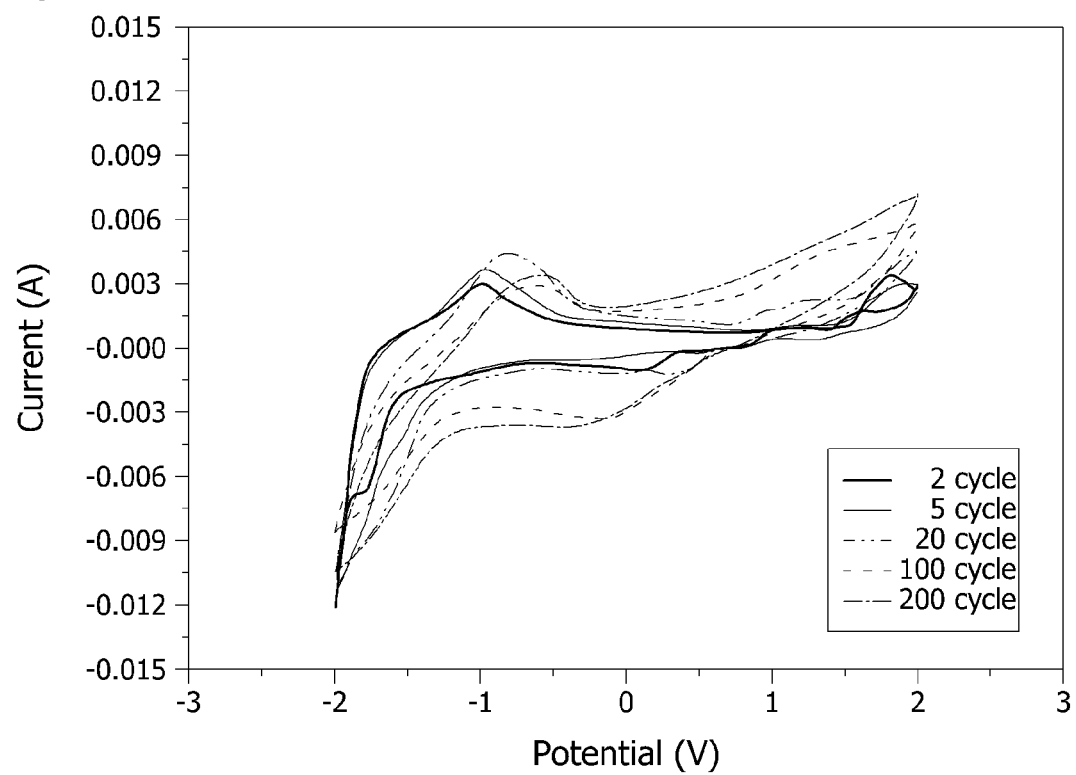

[Figure 6]
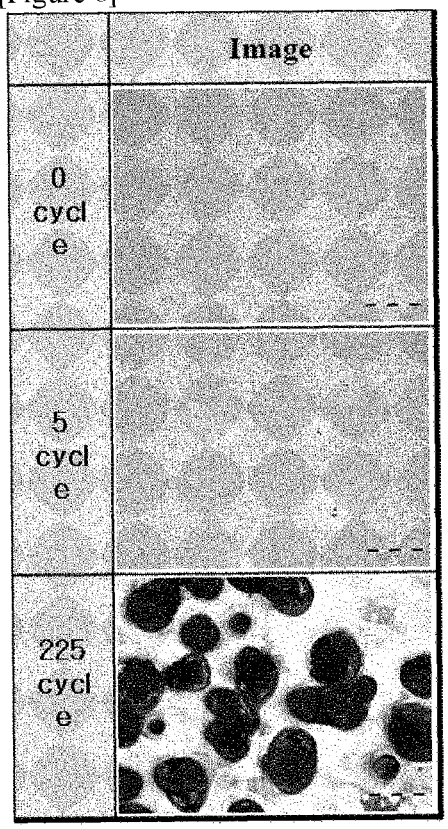

[Figure 7]
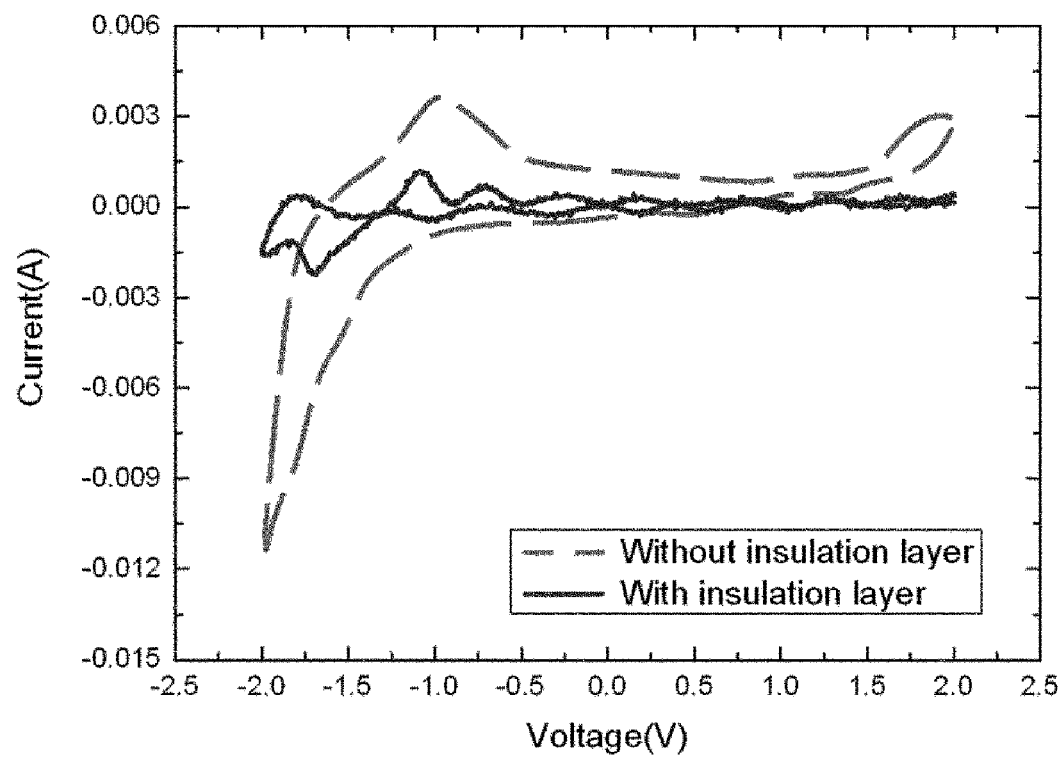

[Figure 8]
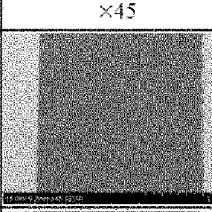

ELECTROCHROMIC DEVICE

This application claims the benefit of priority based on Korean Patent Application No. 10-2016-0056310 filed on May 9, 2016, the disclosure of which is incorporated herein by reference in its entirety.

TECHNICAL FIELD

The present invention relates to an electrochromic device.

BACKGROUND ART

The electrochromic device refers to an element that utilizes a reversible color change appearing when an electrochromic material causes an electrochemical oxidation or reduction reaction. Such an electrochromic device has a disadvantage that the response speed is slow, but the device having a wide area can be manufactured even at a small cost and first of all, it has an advantage that power consumption is low. Accordingly, the electrochromic device has attracted attention in various fields such as smart windows, smart mirrors, electronic papers or next generation architectural window materials.

Conventional electrochromic devices are formed by comprising a first electrode (for example, an ITO electrode), an electrochromic layer provided on the first electrode, an electrolyte layer provided on the electrochromic layer, an ion storage layer provided on the electrolyte layer, and a second electrode (for example, an ITO electrode) provided on the ion storage layer. The electrochromic layer and/or the ion storage layer may comprise an electrochromic material, where the color may change according to an applied voltage. In addition, a transparent base material formed of glass or a polymer resin may be further provided on one side of the first electrode and/or the second electrode.

In order to overcome the slow reaction rate of the conventional electrochromic device, it was necessary to introduce a transparent electrode having a low resistance. In particular, the conventional ITO electrode caused a difference in the discoloration reaction rate by a voltage drop occurring in a wide area electrochromic device due to a high resistance, and as a technique to overcome this, a transparent electrode having a low resistance, such as metal mesh or OMO, has been actively developed.

Furthermore, various types of auxiliary electrodes have been developed to improve the reaction rate of the electrochromic device.

DISCLOSURE

Technical Problem

It is a problem to be solved by the present invention to provide an electrochromic device capable of high-speed driving by improving the reaction rate.

Also, it is a problem to be solved by the present invention to provide an electrochromic device capable of preventing metal elution from an auxiliary electrode.

Technical Solution

To solve the above-described problems, according to one aspect of the present invention, there is provided an electrochromic device comprising: a first electrode layer, a first electrochromic layer provided on the first electrode layer, an electrolyte layer provided on the first electrochromic layer, a second electrochromic layer provided on the electrolyte layer, and a second electrode layer provided on the second electrochromic layer, wherein it comprises a first auxiliary electrode layer and a second auxiliary electrode layer each provided on each opposite surface of the first electrochromic layer and the second electrochromic layer opposed to each other with the electrolyte layer interposed therebetween, and the first and second auxiliary electrode layers each comprise an electrode portion formed of a metal material and an insulation portion for insulating the electrode portion.

In addition, according to another aspect of the present invention, there is provided an electrochromic device comprising: a first electrode layer, a first electrochromic layer provided on the first electrode layer, an electrolyte layer provided on the first electrochromic layer, a second electrochromic layer provided on the electrolyte layer, and a second electrode layer provided on the second electrochromic layer, wherein it comprises a first auxiliary electrode layer and a second auxiliary electrode layer each provided on each opposite surface of the first electrode layer and the second electrode layer opposed to each other with the electrolyte layer interposed therebetween, and the first and second auxiliary electrode layers each comprise an electrode portion formed of a metal material and an insulation portion for insulating the electrode portion.

Advantageous Effects

As described above, the electrochromic device related to one embodiment of the present invention has the following effects.

By facing a pair of auxiliary electrodes or arranging them to be staggered, the electrochromic device can have an improved reaction rate, thereby having the advantage that the high-speed driving is possible. Furthermore, it is possible to prevent the metal from being eluted from the auxiliary electrode through insulation.

BRIEF DESCRIPTION OF DRAWINGS

FIG. 1 is a conceptual diagram showing an electrochromic device related to a first embodiment of the present invention.

FIG. 2 is a conceptual diagram showing an electrochromic device related to a second embodiment of the present invention.

FIG. 3 is a conceptual diagram showing a second auxiliary electrode layer.

FIGS. 4 to 8 are analysis results for explaining metal elution of an auxiliary electrode layer.

MODE FOR INVENTION

Hereinafter, an electrochromic device according to one embodiment of the present invention will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIG. 1 is a conceptual diagram showing an electrochromic device related to a first embodiment of the present invention, and FIG. 2 is a conceptual diagram showing an electrochromic device related to a second embodiment of the present invention.

Referring to FIG. 1, the electrochromic device (100) related to the first embodiment comprises a first electrode layer (130), a first electrochromic layer (150) provided on the first electrode layer (130), an electrolyte layer (170) provided on the first electrochromic layer (150), a second electrochromic layer (160) provided on the electrolyte layer (170) and a second electrode layer (140) provided on the second electrochromic layer (160).

In addition, a reference numeral 110 denotes a first substrate on which the first electrode layer (130) is provided and a reference numeral 120 denotes a second substrate on which the second electrode layer (140) is provided.

Furthermore, the electrochromic device (100) comprises a first auxiliary electrode layer (190) and a second auxiliary electrode layer (180) each provided on each opposite surface of the first electrochromic layer (150) and the second electrochromic layer (160) opposed to each other with the electrolyte layer (170) interposed therebetween.

Referring to FIG. 2, the electrochromic device (200) related to the second embodiment comprises a first electrode layer (130), a first electrochromic layer (150) provided on the first electrode layer (130), an electrolyte layer (170) provided on the first electrochromic layer (150), a second electrochromic layer (160) provided on the electrolyte layer (170) and a second electrode layer (140) provided on the second electrochromic layer (160).

In addition, the electrochromic device (200) comprises a first auxiliary electrode layer (190) and a second auxiliary electrode layer (180) each provided on each opposite surface of the first electrode layer (130) and the second electrode layer (140) opposed to each other with the electrolyte layer (170) interposed therebetween.

Referring to FIGS. 1 and 2, the electrochromic device (100) of the first embodiment and the electrochromic device (200) of the second embodiment differ only at the positions where the first auxiliary electrode layer (190) and the second auxiliary electrode layer (180) are formed. That is, in FIGS. 1 and 2, the components indicated by the same reference numerals are the same.

The first substrate (110) and the second substrate (120) may be formed of glass or a polymer resin (for example, PET, PES, or the like).

The first and second electrode layers (130, 140) are a component for supplying electric charges to the electrochromic layers (150, 170), where each can be formed by comprising any one of a transparent conductive oxide selected from the group consisting of ITO (Indium Tin Oxide), FTO (Fluor doped Tin Oxide), AZO (Aluminium doped Zinc Oxide), GZO (Galium doped Zinc Oxide), ATO (Antimony doped Tin Oxide), IZO (Indium doped Zinc Oxide), NTO (Niobium doped Titanium Oxide), ZnO, OMO (Oxide/Metal/Oxide) and CTO; silver (Ag) nanowires; metal meshes; or OMO (oxide metal oxide). The first and second electrode layers (130, 140) are each a transparent electrode layer, which can be formed by comprising a material having a high transmittance to light, a low sheet resistance and a permeation resistance, and can be composed of an electrode plate shape.

The method of forming each of the electrode layers (150, 170) is not particularly limited, and any known method may be used without limitation. For example, a thin film electrode layer containing transparent conductive oxide particles can be formed on a glass base layer through a process such as sputtering or printing (screen printing, gravure printing, inkjet printing, etc.). The electrode layer thus prepared may have a thickness in a range of 10 nm to 500 nm in the case of the vacuum method, and may have a thickness in a range of 0.1 µm to 20 µm in the case of the printing method. In one example, the electrochromic device comprising the electrode layer may have a transmittance for visible light of 70% to 95%.

In addition, the first electrochromic layer (150) may comprise a discoloring material having a chromogenic property complementary to that of the electrochromic material contained in the second electrochromic layer (160). The complementary chromogenic property refers to a case where the types of reactions in which the electrochromic material can be colored are different from each other, and for example, it means a case where the reductive discoloring material is used in the first electrochromic layer (150), when the oxidative discoloring material is used in the second electrochromic layer (160). As the discoloring material having the complementary chromogenic property is contained in the first electrochromic layer (150) and the second electrochromic layer (160), respectively, for example, the coloring of the first electrochromic layer (150) by the reduction reaction and the coloring of the second electrochromic layer (160) by the oxidation reaction can be performed at the same time, and in the contrary case, the decoloring of the first electrochromic layer (150) and the second electrochromic layer (160) can be performed at the same time. As a result, coloring and decoloring of the entire device can be performed at the same time. The coloring and decoloring as above may be alternated according to the polarity of the voltage applied to the device.

In one example, when an oxidative discoloring material is used for the second electrochromic layer (160), the first electrochromic layer (150) may comprise a reductive discoloring material such as tungsten oxide (WOx) as an electrochromic material. The method of forming the first and second electrochromic layers (150, 170) comprising the electrochromic material is not particularly limited and may be performed by, for example, vapor deposition.

The oxidative discoloring material may mean a material that is discolored when an oxidation reaction occurs, and the reductive discoloring material may mean a material that is discolored when a reduction reaction occurs. As the oxidative discoloring material, an oxide of Co, Rh, Ir, Ni, Cr, Mn and Fe, for example, $LiNiO_2$, $IrO_2$, NiO, $V_2O_5$, $LixCoO_2$, $Rh_2O_3$ or $CrO_3$ and the like is used, and as the reductive discoloring material, an oxide of Ti, V, Nb, Ta, Mo and W, for example, $WO_3$, $MoO_3$, $Nb_2O_5$, $Ta_2O_5$ or $TiO_2$ and the like is used, but the discoloring materials of the present application are not limited to the above oxides.

In the electrolyte layer (170), the type of the electrolyte, used in the electrolyte layer, as a material that provides a moving environment of hydrogen ions or lithium ions for discoloring or decoloring of the electrochromic material, is not particularly limited, and a liquid electrolyte, a gel polymer electrolyte or an inorganic solid electrolyte may be used.

The electrolyte may comprise one or more compounds, for example, of compounds comprising $H^+$, $Li^+$, $Na^+$, $K^+$, $Rb^+$, or $Cs^+$. In one example, the electrolyte layer may comprise a lithium salt compound such as $LiClO_4$, $LiBF_4$, $LiAsF_6$, or $LiPF_6$. The ions included in the electrolyte may play a part in discoloration or light transmittance change of the device while being inserted into or removed from the first electrochromic layer (150) or the first electrochromic layer (170) depending on the polarity of the applied voltage.

In one example, the electrolyte may further comprise a carbonate compound. Since the carbonate-based compound has a high dielectric constant, the ion conductivity provided by the lithium salt can be increased. As the carbonate-based compound, at least one of PC (propylene carbonate), EC (ethylene carbonate), DMC (dimethyl carbonate), DEC (diethyl carbonate) and EMC (ethylmethyl carbonate) may be used.

In one example, when an inorganic solid electrolyte is used in the electrolyte layer, the electrolyte may comprise LiPON or $Ta_2O_5$. Furthermore, the inorganic solid electrolyte may be an electrolyte in which components such as B, S, and W are added to LiPON or $Ta_2O_5$.

In addition, the electrochromic devices (100, 200) may further comprise a power source (driving part) for applying a voltage to the electrochromic layers (150, 170).

Furthermore, the first and second auxiliary electrode layers (190, 180) may be each formed of a metal material having a high electrical conductivity, and for example, may be formed of a material having high electrical conductivity such as silver (Ag) or copper (Cu). Also, the first auxiliary electrode layer (190) and the second auxiliary electrode layer (180) may each have a metal mesh or metal strip pattern. The metal mesh pattern may include a first component extending in a first direction and a second component extending in a second direction to intersect the first component. At this time, it may have a plurality of openings by the cross structure of pluralities of first and second components. In addition, the metal strip may have a strip shape extending in one direction.

FIG. 3 is a conceptual diagram showing a second auxiliary electrode layer (180), and FIGS. 4 to 8 are analysis results for explaining metal elution of an auxiliary electrode layer. As described above, since the first and second auxiliary electrode layers (190, 180) have the same structure, the second auxiliary electrode layer will be described as an example.

Also, the first auxiliary electrode layer (190) and the second auxiliary electrode layer (180) may each comprise an electrode portion (191, 181) of a metal material and an insulation portion (192, 182) for insulating the electrode portion (191, 181). The insulation portion is provided to prevent elution of the electrode portion upon operating the electrochromic devices (100, 200). In addition, the insulation portion may have a layer structure surrounding the electrode portion. For example, in FIG. 1, the insulation portion (192, 182) may surround the electrode portion so as to insulate the electrode portion (191, 181) from the electrolyte layer (170). Furthermore, in FIG. 2, the insulation portion (192, 182) may surround the electrode portion (191, 181) so as to insulate the electrode portion (191, 181) from the first and second electrochromic layers (150, 170), respectively.

Referring to FIGS. 4 and 6, due to permeation of ions or electrons, a problem of elution of the electrode portion in each auxiliary electrode layer may occur. In particular, referring to FIG. 5, when analyzing the problem of metal elution through CV, it can be confirmed that the addition reaction starts to occur after 20 cycle, and a completely different curve from the shape of the initial cycle is shown after 100 cycle and 200 cycle.

In addition, referring to FIGS. 7 and 8, when the case without insulation portion (without insulation layer) and the case with insulation portion (with insulation layer) are compared, it can be confirmed that the repeated durability can be ensured through the insulation portion.

In particular, the insulation portion may be composed by comprising a resin material as a material that can prevent permeation of ions or electrons. For example, a resin of acrylate or epoxy series may be used, and some of an inorganic filler or an inorganic filling material may be included.

In addition, referring to FIG. 3, for each of an electrode portion (181) and an insulation portion (182), in one example, a (width of the insulation portion) may be 5 mm or less, b, c (width of the electrode portion) and d may be each 3 mm or less, e (thickness of the electrode portion) may be 1 mm or less, and f (thickness of the insulation portion) may be 2 mm or less. Also, c/a may be 0.9 or less, and b/d may be 1.5 or less.

On the other hand, the first and second auxiliary electrode layers (190, 180) may be arranged asymmetrically on the basis of the electrolyte layer (170). That is, the first and second auxiliary electrode layers (190, 180) may be arranged to be staggered on the basis of the electrolyte layer (170).

There is a difference in time taken to reach a specific transmittance, depending on the degree of density of the electric field generated by the first and second auxiliary electrode layers (190, 180).

The preferred embodiments of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

According to the present invention, it is possible to improve the reaction rate of the electrochromic device by facing a pair of auxiliary electrodes or arranging them to be staggered, and it is possible to prevent elution of metal from the auxiliary electrode through insulation.

The invention claimed is:
1. An electrochromic device comprising:
a first electrode layer;
a first electrochromic layer provided on the first electrode layer;
an electrolyte layer provided on the first electrochromic layer;
a second electrochromic layer provided on the electrolyte layer;
a second electrode layer provided on the second electrochromic layer; and
a first auxiliary electrode layer and a second auxiliary electrode layer each provided on an opposed surface of the first electrochromic layer and the second electrochromic layer facing each other with the electrolyte layer interposed therebetween such that the electrolyte layer directly contacts the first auxiliary electrode layer and the second auxiliary electrode layer,
wherein the first and second auxiliary electrode layers each comprise an electrode portion formed of a metal material and an insulation portion for insulating the electrode portion.
2. The electrochromic device according to claim 1,
wherein the first and second auxiliary electrode layers are formed in a metal mesh or metal strip pattern.
3. The electrochromic device according to claim 1,
wherein the first and second auxiliary electrode layers each comprise an electrode portion formed of a metal material and an insulation portion surrounding said electrode portion so as to insulate said electrode portion.

4. The electrochromic device according to claim 1, wherein the first and second auxiliary electrode layers are each formed in a metal mesh pattern,
   wherein the metal mesh pattern includes a first component extending in a first direction and a second component extending in a second direction to intersect the first component, and the metal mesh pattern have a plurality of openings by the cross structure of pluralities of first and second components,
   wherein the first and second auxiliary electrode layers are arranged asymmetrically on the basis of the electrolyte layer,
   wherein said insulation portion has a width of 5 mm or less and a thickness of 2 mm or less,
   wherein said electrode portion has a width of 3 mm or less and a thickness of 1 mm or less, and
   wherein the ratio (c/a) of the width of the electrode portion (c) to the width of the insulation portion (a) is 0.9 or less.

5. The electrochromic device according to claim 3, wherein said insulation portion is formed of a resin material.

6. The electrochromic device according to claim 5, wherein said insulation portion further comprises an inorganic filler or an inorganic filling agent.

7. The electrochromic device according to claim 3, wherein said insulation portion is formed of a resin of acrylate or epoxy series.

8. The electrochromic device according to claim 3, wherein said insulation portion has a width of 5 mm or less and a thickness of 2 mm or less.

9. The electrochromic device according to claim 3, wherein said electrode portion has a width of 3 mm or less and a thickness of 1 mm or less.

10. An electrochromic device comprising:
    a first electrode layer;
    a first electrochromic layer provided on the first electrode layer;
    an electrolyte layer provided on the first electrochromic layer;
    a second electrochromic layer provided on the electrolyte layer;
    a second electrode layer provided on the second electrochromic layer; and
    a first auxiliary electrode layer and a second auxiliary electrode layer each provided an opposed surface of the first electrode layer and the second electrode layer facing each other with the electrolyte layer interposed therebetween,
    wherein an interface between the electrolyte layer and each of the first electrochromic layer and the second electrochromic layer are planar such that the first and second auxiliary electrode layers do not extend into the electrolyte layer, and
    the first and second auxiliary electrode layers each comprise an electrode portion formed of a metal material and an insulation portion for insulating the electrode portion.

11. The electrochromic device according to claim 10, wherein the first and second auxiliary electrode layers are formed in a metal mesh or metal strip pattern.

12. The electrochromic device according to claim 10, wherein the first and second auxiliary electrode layers are each formed in a metal mesh pattern,
    wherein the metal mesh pattern includes a first component extending in a first direction and a second component extending in a second direction to intersect the first component, and the metal mesh pattern have a plurality of openings by the cross structure of pluralities of first and second components,
    wherein the first and second auxiliary electrode layers are arranged asymmetrically on the basis of the electrolyte layer,
    wherein said insulation portion has a width of 5 mm or less and a thickness of 2 mm or less,
    wherein said electrode portion has a width of 3 mm or less and a thickness of 1 mm or less, and
    wherein the ratio (c/a) of the width of the electrode portion (c) to the width of the insulation portion (a) is 0.9 or less.

13. The electrochromic device according to claim 10, wherein the first and second auxiliary electrode layers each comprise an electrode portion formed of a metal material and an insulation portion surrounding said electrode portion so as to insulate said electrode portion.

14. The electrochromic device according to claim 13, wherein said insulation portion is formed of a resin material.

15. The electrochromic device according to claim 13, wherein said insulation portion is formed of a resin of acrylate or epoxy series.

16. The electrochromic device according to claim 14, wherein said insulation portion further comprises an inorganic filler or an inorganic filling agent.

17. The electrochromic device according to claim 13, wherein said insulation portion has a width of 5 mm or less and a thickness of 2 mm or less.

18. The electrochromic device according to claim 13, wherein said electrode portion has a width of 3 mm or less and a thickness of 1 mm or less.

* * * * *